(12) United States Patent
Singh et al.

(10) Patent No.: US 11,036,466 B1
(45) Date of Patent: Jun. 15, 2021

(54) SOCIAL MEDIA CUSTOM AUDIO PROGRAM

(71) Applicant: Facebook, Inc., Menlo Park, CA (US)

(72) Inventors: Ujjwal Singh, Menlo Park, CA (US); Frank Petterson, Menlo Park, CA (US); Alexander Paul Stein, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/805,327

(22) Filed: Feb. 28, 2020

(51) Int. Cl.
*G06F 3/16* (2006.01)
*G06F 16/638* (2019.01)

(52) U.S. Cl.
CPC ............ *G06F 3/165* (2013.01); *G06F 16/639* (2019.01)

(58) Field of Classification Search
CPC ................................. G06F 3/16; G06F 16/638
USPC .......................................................... 700/94
See application file for complete search history.

(56) References Cited

U.S. PATENT DOCUMENTS

| 8,903,910 | B2 | 12/2014 | Kallayil |
| 10,203,216 | B2 | 2/2019 | Kennedy et al. |
| 10,402,450 | B2 | 9/2019 | Goodman et al. |
| 2008/0046948 | A1 | 2/2008 | Verosub |
| 2008/0211661 | A1* | 9/2008 | Gifford ................... H04H 60/51 340/522 |
| 2011/0295498 | A1* | 12/2011 | Labidi ................... G06Q 10/109 455/418 |
| 2014/0195605 | A1* | 7/2014 | Kallayil ................... H04L 67/22 709/204 |
| 2016/0064033 | A1* | 3/2016 | Koul ....................... G10L 13/10 704/270 |
| 2016/0214481 | A1* | 7/2016 | Othmer ................... B60K 37/06 |

* cited by examiner

*Primary Examiner* — Melur Ramakrishnaiah
(74) *Attorney, Agent, or Firm* — Sheppard Mullin Richter & Hampton LLP

(57) ABSTRACT

Systems and methods for making and using social media custom audio programs are disclosed. In general, one aspect disclosed features a system, comprising: a hardware processor; and a non-transitory machine-readable storage medium encoded with instructions executable by the hardware processor to perform a method for creating a custom audio program for a user for a journey, the method comprising: extracting journey-related information representing one or more aspects of the journey; generating one or more journey-related audio segments based on the journey-related information; extracting interest-related information from social media of the user, wherein the interest-related information excludes information regarding a history of audio segments played by the user; obtaining one or more interest-related audio segments based on the interest-related information; and assembling the custom audio program using the one or more journey-related audio segments and the one or more interest-related audio segments.

18 Claims, 9 Drawing Sheets

600

602 — Welcome <name> to your daily drive.

604 — It's <day name>, <date>.

606 — It's going to be a bit <hotter / colder / about the same> as yesterday,

608 — with highs in <low / mid / high> < 20 / - / 100 >.

610 — For your commute, traffic looks <lighter / heavier / about the same> as yesterday.

612 — It should take around < 10 / - / 80 > minutes to get to <work/home>.

614 — We've got a great show today. Let's hear what's coming up:

618 — Show Preview

FIG. 6

SOCIAL MEDIA CUSTOM AUDIO PROGRAM

FIELD OF THE INVENTION

The present disclosure relates generally to making and using audio programs such as podcasts and the like.

SUMMARY

In general, one aspect disclosed features a system, comprising: a hardware processor; and a non-transitory machine-readable storage medium encoded with instructions executable by the hardware processor to perform a method for creating a custom audio program for a user for a journey, the method comprising: extracting journey-related information representing one or more aspects of the journey; generating one or more journey-related audio segments based on the journey-related information; extracting interest-related information from social media of the user, wherein the interest-related information excludes information regarding a history of audio segments played by the user; obtaining one or more interest-related audio segments based on the interest-related information; and assembling the custom audio program using the one or more journey-related audio segments and the one or more interest-related audio segments.

Embodiments of the system may include one or more of the following features. In some embodiments, the method further comprises, responsive to receiving a request from the user, sharing all or part of the custom audio program with other users. In some embodiments, the method further comprises receiving a selection, by the user, of one of the audio segments; and responsive to receiving the selection, (i) obtaining one or more further audio segments that are related to the selected one of the audio segments, and (ii) adding the one or more further audio segments to the custom audio program. In some embodiments, assembling the custom audio program comprises: selecting a plurality of the audio segments according to durations of the audio segments and a duration of the journey. In some embodiments, assembling the custom audio program comprises: ranking the audio segments according to the interest-related information; and adding the audio segments to the custom audio program according to the ranking. In some embodiments, the method further comprises adding an introductory audio segment to the beginning of the custom audio program, wherein the introductory segment is customized for the user. In some embodiments, the method further comprises determining a target mood for the user; and selecting at least one of the interest-related audio segments based on the target mood.

In general, one aspect disclosed features a non-transitory machine-readable storage medium encoded with instructions executable by the hardware processor to perform a method for creating a custom audio program for a user for a journey, the method comprising: extracting journey-related information representing one or more aspects of the journey; generating one or more journey-related audio segments based on the journey-related information; extracting interest-related information from social media of the user, wherein the interest-related information excludes information regarding a history of audio segments played by the user; obtaining one or more interest-related audio segments based on the interest-related information; and assembling the custom audio program using the one or more journey-related audio segments and the one or more interest-related audio segments.

Embodiments of the non-transitory machine-readable storage medium may include one or more of the following features. In some embodiments, the method further comprises, responsive to receiving a request from the user, sharing all or part of the custom audio program with other users. In some embodiments, the method further comprises receiving a selection, by the user, of one of the audio segments; and responsive to receiving the selection, (i) obtaining one or more further audio segments that are related to the selected one of the audio segments, and (ii) adding the one or more further audio segments to the custom audio program. In some embodiments, assembling the custom audio program comprises: selecting a plurality of the audio segments according to durations of the audio segments and a duration of the journey. In some embodiments, assembling the custom audio program comprises: ranking the audio segments according to the interest-related information; and adding the audio segments to the custom audio program according to the ranking. In some embodiments, the method further comprises adding an introductory audio segment to the beginning of the custom audio program, wherein the introductory segment is customized for the user. In some embodiments, the method further comprises determining a target mood for the user; and selecting at least one of the interest-related audio segments based on the target mood.

In general, one aspect disclosed features a computer-implemented method for creating a custom audio program for a user for a journey, the method comprising: extracting journey-related information representing one or more aspects of the journey; generating one or more journey-related audio segments based on the journey-related information; extracting interest-related information from social media of the user, wherein the interest-related information excludes information regarding a history of audio segments played by the user; obtaining one or more interest-related audio segments based on the interest-related information; and assembling the custom audio program using the one or more journey-related audio segments and the one or more interest-related audio segments.

Embodiments of the method may include one or more of the following features. Some embodiments comprise, responsive to receiving a request from the user, sharing all or part of the custom audio program with other users. Some embodiments comprise receiving a selection, by the user, of one of the audio segments; and responsive to receiving the selection, (i) obtaining one or more further audio segments that are related to the selected one of the audio segments, and (ii) adding the one or more further audio segments to the custom audio program. In some embodiments, assembling the custom audio program comprises: selecting a plurality of the audio segments according to durations of the audio segments and a duration of the journey. In some embodiments, assembling the custom audio program comprises: ranking the audio segments according to the interest-related information; and adding the audio segments to the custom audio program according to the ranking. Some embodiments comprise adding an introductory audio segment to the beginning of the custom audio program, wherein the introductory segment is customized for the user.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 depicts the structure of an example personalized introduction for a commute, according to some embodiments of the disclosed technology.

The figures are not exhaustive and do not limit the present disclosure to the precise form disclosed.

DETAILED DESCRIPTION

Audio programs have long been a source of information and entertainment. Unlike video programs, audio programs allow the listener to engage with the listener's environment while enjoying the program. This feature allows listeners to enjoy the programs while engaged in important tasks such as driving. For example, many commuters subscribe to podcasts, and enjoy them during their commutes.

The advent of the Internet has allowed a tremendous increase in the number of available audio programs, for example in the form of podcasts. Currently, it is estimated there are more than 700,000 active podcasts, with more than 29,000,000 episodes. This bounty presents the listener with a bewildering array of choices. Finding audio programs that will interest the listener has become a difficult problem.

One current approach to this problem uses a history of audio programs previously played by a listener to recommend related audio programs. But because this approach relies upon choices already made by the listener, it does not solve the problem.

Embodiments of the disclosed technology employ information collected from a user's social media to select audio segments for the user, and in particular without relying upon the user's listening history. This approach expands the selection beyond the user's previous choices, while also bounding the selection within the vast array of choices available.

Embodiments of the disclosed technology also employ information related to the user's commute. For example, audio segments may be generated that describe the length of the commute, estimated time of arrival or destination, traffic accidents affecting the commute, weather conditions along the commute, and the like.

In some embodiments, audio segments may be selected and concatenated to form a custom audio program. The audio segments may be selected such that the custom audio program has a duration similar to that of a commute. But while sometimes described in terms of a commute, it should be understood that the disclosed technology applies equally well to any journey.

Figure 1:
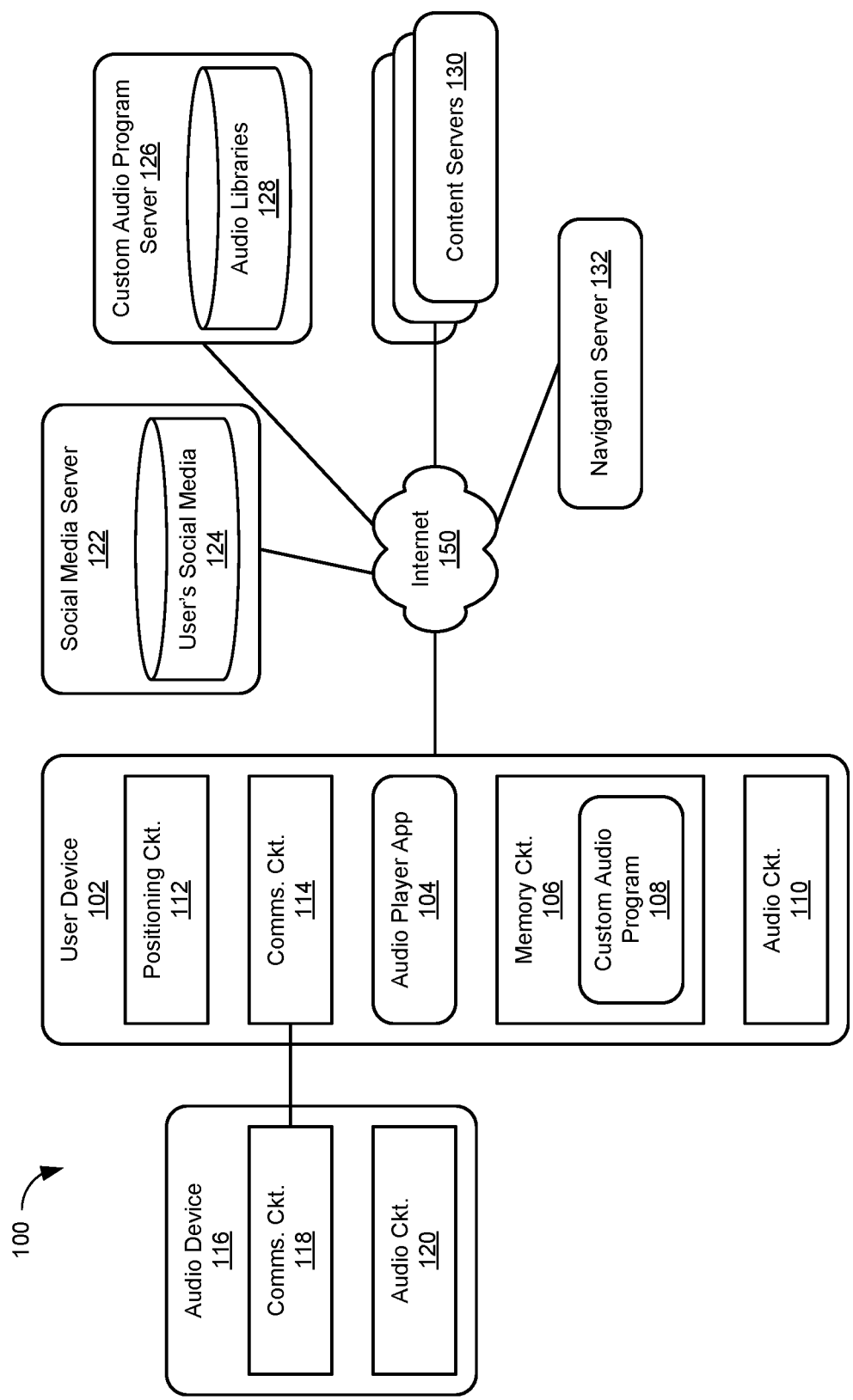
FIG. 1 depicts a block diagram of an example system for making and using custom audio programs according to some embodiments of the disclosed technology.

FIG. 1 depicts a block diagram of an example system 100 for making and using custom audio programs according to some embodiments of the disclosed technology. While some embodiments may employ all of the depicted elements of system 100, it should be understood that other embodiments may employ less than all of the depicted elements.

Referring to FIG. 1, the system 100 may include a user device 102. The user device 102 may be implemented as any sort of device capable of performing the functions described herein for the user device 102. For example, the user device 102 may be implemented as a smart phone, tablet, laptop, automotive head unit, dedicated media player, and the like.

The user device 102 may include an audio player app 104. The audio player app 104 may be implemented as any application capable of playing an audio file. For example, the audio player app 104 may be implemented as a podcast player app, a media player app, a music player app, and the like.

The user device 102 may include a memory circuit 106. The memory circuit 106 may store a custom audio program 108. The memory circuit 106 may be implemented as any memory. The custom audio program 108 may be created according to the technology described herein.

The user device 102 may include an audio circuit 110. The audio circuit 110 may be implemented as any circuit capable of rendering audio as sound. As used herein, the term "audio" is used to refer to a signal that represents sound. For example, the audio circuit 110 may include a speaker, or the like. In operation, the audio player app 104 generates audio based on the custom audio program 108 stored in the memory circuit 106, and the audio circuit 110 renders this audio as sound.

In some embodiments, the user device 102 may include a positioning circuit 112. The positioning circuit 112 may be implemented as any circuit capable of determining a geo-location of the user device 102. For example, the positioning circuit 112 may be implemented as a global positioning system (GPS) receiver. The positioning circuit 112 may use other signals in addition to, or instead of, GPS signals. For example, the positioning circuit 112 may use Wi-Fi signals for geolocation.

In some embodiments, the user device 102 may include a communications circuit 114 to communicate with an audio device 116. The communications may be wired or wireless. For example, the audio device 116 may be implemented as a Bluetooth headset, corded earbuds, and the like. Accordingly, the communication circuit 114 may be implemented as a Bluetooth transceiver, as a wired communications interface, and the like.

The audio device 116 may include a communications circuit 118 to communicate with the user device 102. The audio device 116 may include an audio circuit 120. The communications circuit 118 and the audio circuit 120 of the audio device 116 may be implemented in a similar manner to that described above for the communication circuit 114 and the audio circuit 110 of the user device 102, respectively.

The system 100 may include a social media server 122. The social media server may store the user's social media 124. The user's social media 124 may be stored in any manner capable of performing the functions described herein. For example, the user's social media 124 may be implemented as a network-connected database, or the like. As used herein, the term "social media" includes any media provided by any social network used by the user. For example, social media may include information regarding and/or provided by the user and other users in the user's social network, referred to herein as "friends." Social media may include social content, social signals, and the like. Social content may include content shared by the user or a friend, for example such as videos, photos, articles, comments on shared media, and the like. Social content may include events shared by the user or a friend, messages sent by the user or a friend, and the like. Social content may include messages generated automatically by a social network, such as "Your friend got engaged", "Your friend has a birthday", and the like. Social signals may include indications of interactions of the user or a friend with social content. For example, social signals may indicate whether a friend liked a particular post, whether a friend shared the post, how many times the post has been liked, viewed, shared, and the like. Social signals may include any information describing a social network. For example, social signals may include information regarding a social media group to which the user or a friend belongs.

The system 100 may include a custom audio program server 126. The custom audio program server 126 may be implemented in any manner capable of performing the functions described herein. In particular, the custom audio program server 126 may generate the custom audio programs 108 described herein. Some of the audio segments used to generate the custom audio programs 108 may be drawn from one or more audio libraries 128. The audio segments stored in the audio libraries 128 may be generated locally, drawn from the user's social media 124, drawn from external sources, and the like. The audio segments may include spoken word content, music, other media, and combinations thereof. The audio segments may concern any subject. For example, the audio segments may concern news, weather, traffic, health, entertainment, and the like. The external sources for the audio segments may include one or more content servers 130. The audio libraries 128 may be updated as often as desired to provide timely information and entertainment. For example, the audio libraries 128 may be updated in real time.

The system 100 may include a navigation server 132. The navigation server 132 may provide navigation information to the user device 102. The navigation information may include maps and information regarding a geolocation of the user device 102, routes, traffic, travel times, and the like. The navigation server 132 may host a mapping service, which may communicate with the custom audio program server 126, for example through a suitable applications programming interface (API). The mapping service may include a social aspect, where traffic information and related information is drawn from clients of the mapping service.

The social media server 122, the custom audio program server 126, the content servers 130, and the navigation server 132 may be interconnected, and connected with the user device 102, by one or more networks. The one or more networks may include the Internet 150.

Figure 2:
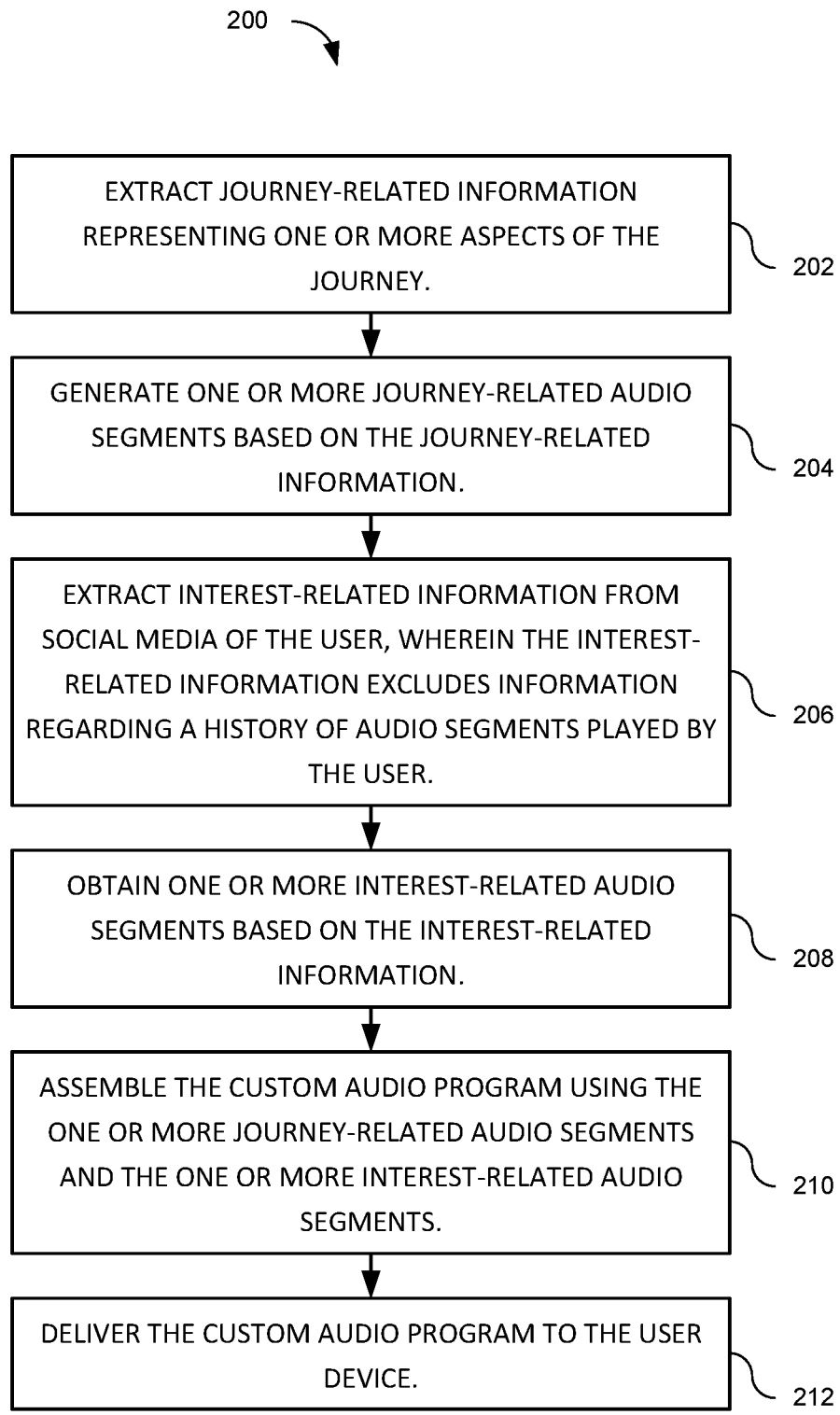
FIG. 2 depicts a process for generating a custom audio program according to some embodiments of the disclosed technology.

FIG. 2 depicts a process 200 for generating a custom audio program 108 according to some embodiments of the disclosed technology. While the elements of the processes disclosed herein are presented in a particular arrangement, it should be understood that one or more of the elements may be omitted, performed in a different order, performed concurrently, and the like. The process 200 may be performed by one or more elements of the example system 100 of FIG. 1. For example, some or all of the process 200 may be performed by the custom audio program server 126.

Referring to FIG. 2, the process 200 may include extracting journey-related information representing one or more aspects of a journey, at 202. The journey may be any journey undertaken by the user. For example, the journey may be a regular commute, an airline flight, a bike ride, a dog walk, or the like. The journey-related information may represent any aspect of the journey. For example, the journey-related information may include a length of the journey, a duration of the journey, locations in the journey, a route of the journey, weather conditions for the route, traffic conditions along the route, information concerning vehicle accidents along the route, information concerning points of interest along the route, and the like.

The journey-related information may be drawn from any source. For example, information concerning the route of the journey may be drawn from the user device 102, the navigation server 132, and the like. As another example, information concerning the timing of the journey may be drawn from the user device 102.

Referring again to FIG. 2, the process 200 may include generating one or more journey-related audio segments based on the journey-related information, at 204. For example, a journey-related audio segment may announce the current time, an estimated duration of the journey, an estimated time of arrival at the destination of the journey, current and forecasted weather along a selected route of the journey, expected traffic conditions along the route, any vehicle accidents along the route, and the like.

The process 200 may include extracting interest-related information from social media of the user, at 206. The interest-related information may include any information that may reflect an interest of the user. The interest-related information may include any social media information or activity, including social content and social signals. For example, the interest-related information may be drawn from a user's profile, current location, location history, purchases, links followed, and the like. As further examples, the interest-related information may be drawn from pages followed by the user, from articles read by the user, from videos watched by the user, from the user's groups, newsfeeds, and events, and the like. Furthermore, interest-related information may be drawn from interests of friends in a similar manner. For example, the interest-related information may indicate meditation as an interest because a friend belongs to a social media group devoted to meditation.

According to some embodiments of the disclosed technology, the interest-related information excludes information regarding audio segments previously played by the user. As mentioned above, this exclusion serves an important purpose. In particular, this exclusion provides the user with new sources of information rather than simply relying upon old sources with which the user is already familiar. But old sources need not be excluded. Indeed, because this approach is based on the interests of the user, it is likely that old sources will reappear.

The process 200 may include obtaining one or more interest-related audio segments based on the interest-related information, at 208. The interest-related audio segments may include any audio segments related to one or more of the interests of the user. For example, if the interest-related information indicates that the user is interested in meditation, the audio segments obtained may include guided meditation instruction, discussions concerning meditation, background music for meditation, and the like.

The process 200 may include assembling a custom audio program 108 using one or more of the journey-related audio segments and one or more of the interest-related audio segments, at 210. For example, the segments may be ranked according to levels of interest of the user, and concatenated in that order. The segments may be selected so as to fill the travel time of the journey, to affect a mood of the user, and the like. Musical segments may be placed between the audio segments to provide enjoyable transitions. These and other features for assembling a custom audio program 108 are described in greater detail below.

The process 200 may include delivering the custom audio program 108 to the user device 102, at 212. In some embodiments, the custom audio program 108 may be streamed to the user device 102. In other embodiments, the custom audio program 108 may be delivered to the user device 102 over the Internet 150 as one or more audio files. In some examples, the custom audio program 108 may be delivered as a single audio file. In other examples, the custom audio program 108 may be delivered as multiple audio files, along with a playlist comprising pointers to the multiple audio files. The elements of the custom audio program 108 may be delivered over the Internet 150.

Figure 3:
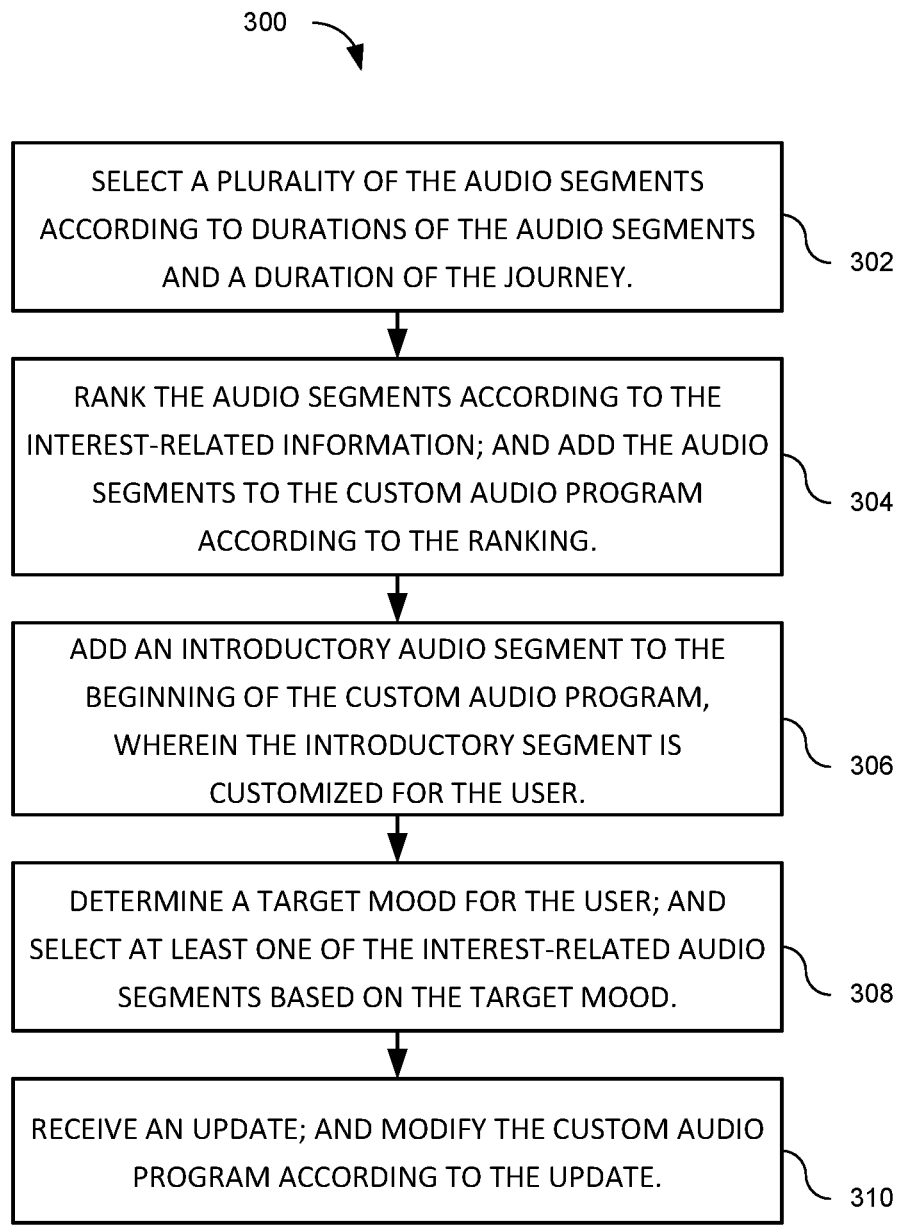
FIG. 3 depicts a process for assembling a custom audio program according to some embodiments of the disclosed technology.

FIG. 3 depicts a process 300 for assembling a custom audio program 108 according to some embodiments of the disclosed technology. The process 300 may be performed by one or more elements of the example system 100 of FIG. 1. For example, some or all of the process 300 may be performed by the custom audio program server 126.

Referring to FIG. 3, the process 300 may include selecting a plurality of audio segments according to durations of the audio segments, and a duration of the journey, at 302. The audio segments may include one or more of the journey-related audio segments, and one or more of the interest-related audio segments, generated and obtained by the process 200 of FIG. 2.

In some cases there will be more audio segments than the custom audio program can accommodate. For example, the sum of the durations of the audio segments may exceed a desired duration of the custom audio program 108. In such cases, a ranking mechanism may be employed to select a suitable subset of the audio segments that best match the user's interests. Therefore, in some embodiments, the process 300 may include ranking the audio segments according to the interest-related information, and adding the audio segments to the custom audio program 108 according to the ranking. Any ranking mechanism may be used. For example, the audio segments may be scored based on correlations between metadata of the audio segments and the user's interests. Furthermore, the user's interests may be ranked in order of importance based on the interest-related information, and the scores may be weighted based on those rankings. Audio segments may be selected for the custom audio program 108 according to the weighted scores, and may be ordered in the custom audio program 108 according to the weighted scores. Journey-related audio segments may appear near the beginning of the custom audio program 108, and may also appear between interest-related audio segments.

The process 300 may include adding an introductory audio segment to the beginning of the custom audio program, at 306. The introductory audio segment may be customized for the user. For example, the introductory audio segments may include a greeting, the user's name, and the date. The introductory audio segment may also include journey-related information, and a summary of the audio segments that follow in the custom audio program 108.

Other segments may be added as well. For example, transition segments may be added between the audio segments, and a concluding "outro" segment may be added at the end of the custom audio program 108. These features are described in further detail below.

In some embodiments, one or more portions of the audio program may be selected to impart a particular mood to the user. For such embodiments, the process may include determining a target mood for the user and selecting at least one of the interest-related audio segments based on the target mood, at 308. In some embodiments, the user may select a mood with a user interface of the user device 102. For example, a touchscreen of the user device 102 may display a plurality of mood icons or colors, allowing the user to select one by tapping the touchscreen. As another example, the user may speak the target mood, which is then captured by a microphone of the user device 102. In some embodiments, the target mood may be selected without direct user input. For example, if traffic is slow, low-energy audio segments and music may be selected to calm the user. As another example, if it is determined that the user is sleepy, for example using a wearable fitness device, high-energy music and audio segments may be selected to rouse the user.

In some embodiments, the system 100 may update the custom audio program 108 dynamically, that is, as it is being played. In such embodiments, the system 100 may receive an update, and may modify the custom audio program according to that update, at 310. For example, the system 100 may modify the custom audio program 108 to include traffic updates, weather updates, breaking news, and the like. In streaming embodiments, the custom audio program server 126 may modify the stream to include the update. In non-streaming embodiments where the custom audio program 108 is provided as a single audio file, the custom audio program server 126 may deliver an updated custom audio program 108 as an audio file that includes the update. In non-streaming embodiments where the custom audio program is provided as multiple audio files with a playlist, the custom audio program server 126 may deliver the update as a new audio file, along with an updated playlist referencing the new audio file. Dynamically updating the custom audio program may include dynamically adding audio segments, dynamically audio removing segments, dynamically modifying audio segments, or any combination thereof.

Figure 4A:
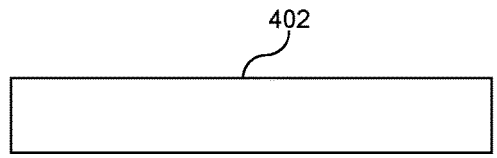
FIGS. 4a through 4e illustrate a process for the assembly of a custom audio program as a single audio file, according to some embodiments of the disclosed technology.

FIGS. 4a through 4e illustrate a process for the assembly of a custom audio program as a single audio file, according to some embodiments of the disclosed technology. First, a container audio "track" 402 is generated based on the duration of the journey, as shown in FIG. 4a. The duration of the audio track 402 may be the same as the duration of the journey or may be shorter or longer than the journey's duration, according to the preferences of the user.

Figure 4B:
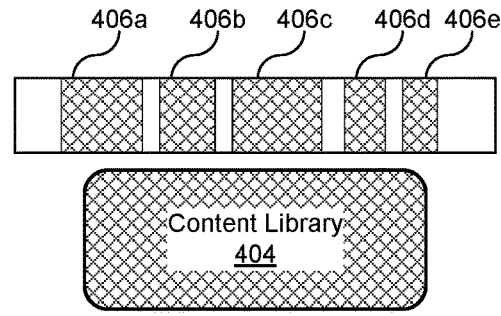

Next, content audio segments 406a through 406b are selected from a content library 404, and are used to populate the container track 402, with suitable intervals between the content audio segments 406, as shown in FIG. 4b with cross-hatch line fill. The content audio segments 406 may be selected and ordered as described in the examples above.

Figure 4C:
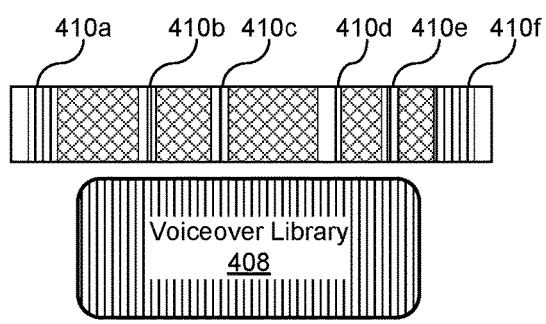

Next, voiceover audio segments 410a through 410f are selected from a voiceover library 408, and are placed in the container track 402, as shown in FIG. 4c with vertical line fill. Each but the last voiceover audio segments 410 may include an introduction to one of the content audio segments 406, and may be placed in the container track 402 so as to immediately precede the respective content audio segment 406. The first voiceover audio segment 410a may include an introduction to the custom audio program, for example as described above. The last voiceover audio segment 410*f* may include a conclusion or "outro" for the custom audio program. The voiceover audio segments 410 may be generated as needed, when the associated content audio segment 406 is added to the content library 404, and the like.

Figure 4D:
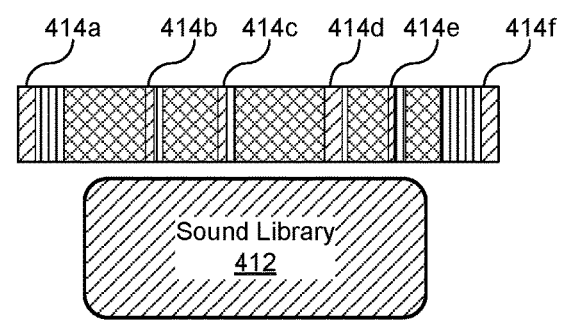

Next, the remaining empty intervals in the custom audio program are filled with audio segments 414*a* through 414*f* from a sound library 412, as shown in FIG. 4*d* with diagonal line fill. These audio segments 414 may include music, back beats, sound effects, and other transitions, introductions, and "outros." In some examples, some or all of the audio segments 414 may overlap a voiceover audio segment 410, a content audio segment 406, or both, in order to provide smooth transitions.

Figure 4E:

Finally, the ordered collection of content audio segments 406, voiceover audio segments 410, and transition audio segments 414 is mastered to create a custom audio program 416, as shown in FIG. 4*e*. Mastering may include production tasks such as equalizing audio levels across all of the audio segments, and the like. After mastering, the custom audio program 416 is ready for delivery to the user device 102.

FIG. 4 illustrates the assembly of the custom audio program as a single audio file. But as noted above, in some embodiments a custom audio program may be delivered to the user device 102 as multiple audio files with a playlist. In such embodiments, each of the audio segments 406, 410, and 414 may be delivered as an individual audio file referenced by the playlist. In other embodiments, each audio file may include one of the content audio segments 406, along with its introductory voiceover audio segment 410 and its transition audio segment 414. Other such combinations are contemplated.

Figure 5:
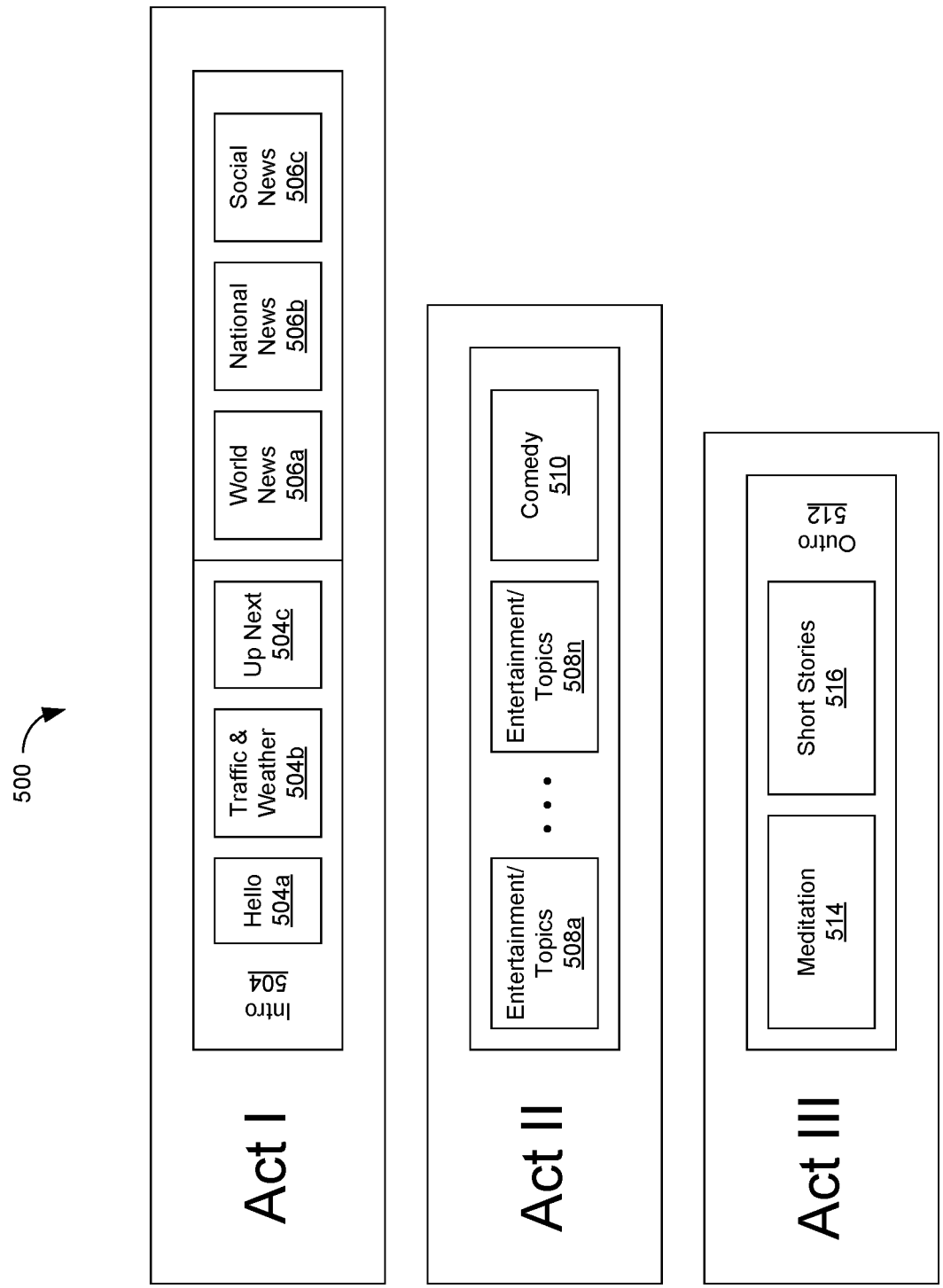
FIG. 5 depicts the structure of an example custom audio program, according to some embodiments of the disclosed technology.

FIG. 5 depicts the structure of an example custom audio program 500, according to some embodiments of the disclosed technology. Referring to FIG. 5, the example custom audio program 500 is structured in three Acts. In this example, Act I includes news and updates. In particular, Act I includes an "intro" 504, followed by three news segments 506. In this example, the "intro" 504 includes a custom greeting, shown as "Hello" at 504*a*, a Traffic & Weather segment 504*b*, and an overview of the custom audio program 500, shown as "Up Next" at 504*c*. The news segments 506 include a "World News" segment 506*a*, followed by a "National News" segment 506*b* and a "Social" segment 506*c*. The "Social" segment 506*c* may describe updates to the user's social media, social networks, and the like.

In the example of FIG. 5, Act II includes one or more audio segments 508*a* through 508*n* relating to entertainment and other topics. In this example, Act II concludes with a "Comedy" segment 510. As the final act, Act III includes an "Outro" segment 512. In this example, the "Outro" segment 512 includes a "Meditation" segment 514, and a segment 516 for "Short Stories."

In some embodiments, the introduction to each custom audio program is highly personalized for the user. FIG. 6 depicts the structure of an example personalized introduction 600 for a commute, according to some embodiments of the disclosed technology. Referring to FIG. 6, the introduction 600 begins with a personalized greeting for the user by name, at 602. Next, the day and date are announced, at 604. Next, a weather forecast is presented, first in a relative form as compared with the day before, at 606, and then quantitatively in terms of expected high and low temperatures and the like, at 608. Next, traffic conditions are described, first in a relative form as compared with the day before, at 610, and then quantitatively in terms of an expected commute time and the like, at 612. The introduction 600 concludes with an overview of the audio segments that follow, first with an introductory statement at 614, followed by a detailed show preview 618. The detailed show preview may be extracted from the audio segments, metadata for the audio segments, or both, and may be rendered using a text-to-speech engine. In some embodiments, background music plays throughout the introduction 600.

Referring again to FIG. 1, the audio player app 104 executing on the user device 102 may play the custom audio program 108. In some embodiments, the audio player app 104 may include one or more additional features. For example, taking a special interest in a topic described in one of the audio segments, a user may "pivot" into that topic to learn more about the topic, for example as described below. As another example, custom audio programs may be shared over the user's social network, for example as described below.

Figure 7:
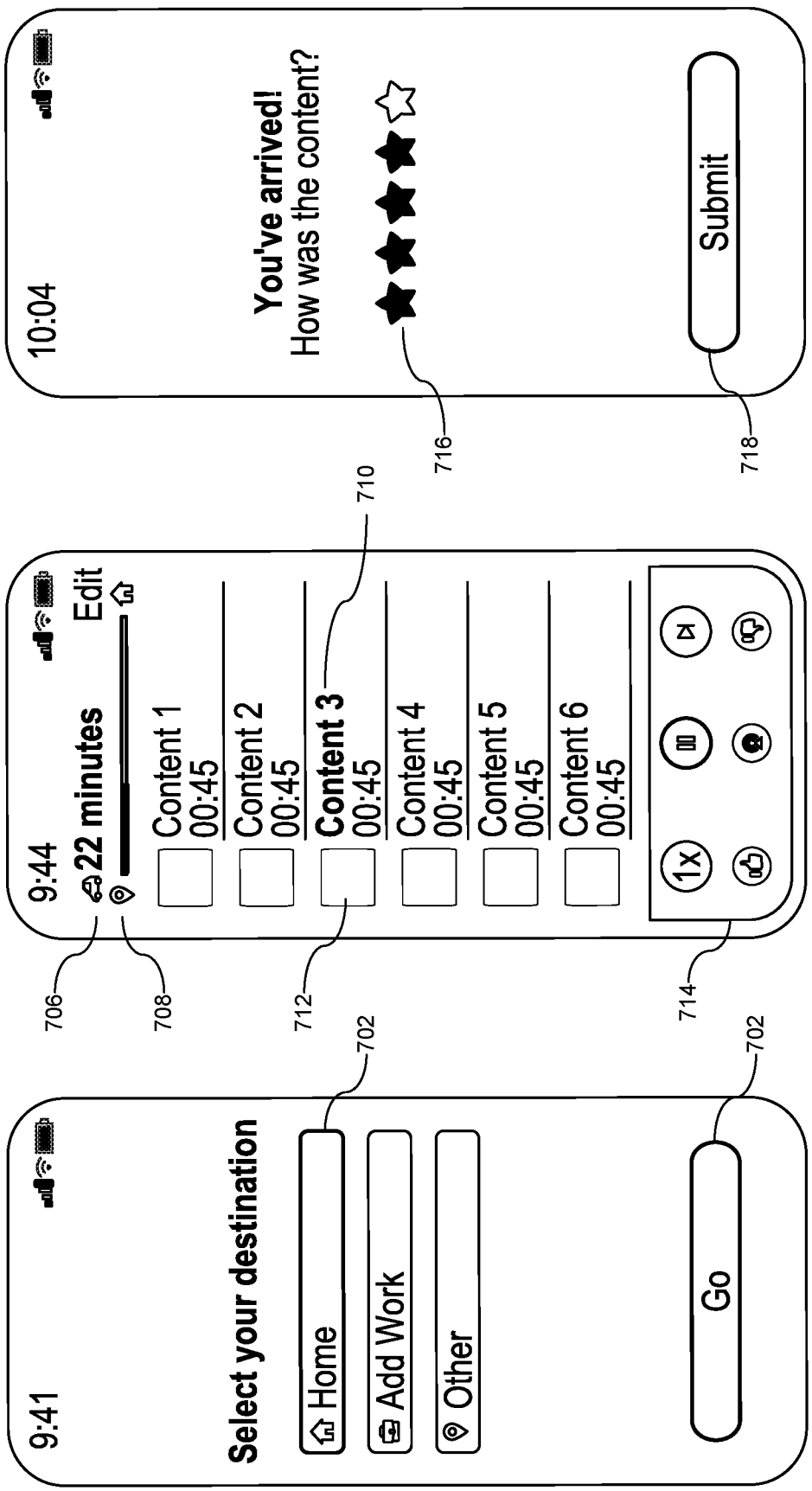
FIGS. 7a through 7c depict example displays that may be generated by the user device of FIG. 1 according to some embodiments of the disclosed technology.

FIGS. 7*a* through 7*c* depict example displays that may be generated by the user device 102 of FIG. 1 according to some embodiments the disclosed technology. FIG. 7*a* depicts an example display that allows a user to specify a destination for a commute. In the example of FIG. 7*a*, the user has selected "Home", at 702, and has confirmed the selection by touching the "Go" button, at 704. At this point, the length of the commute may be determined, and a custom audio program may be generated or modified to accommodate the length of the commute.

FIG. 7*b* depicts an example display that may be shown during the commute, as the custom audio program plays. The commute time has been determined to be 22 minutes, as shown at 706. A progress bar for the custom audio program is shown, at 708. A list of the audio segments that comprise the custom audio program is shown along with their durations, with the currently-playing audio segment highlighted, at 710. "Pivot" buttons 712 are shown next to each of the audio segments. The "pivot" function invoked by operation of the "pivot" buttons 712 is described below. A plurality of controls is shown at 714. The controls include a playback speed control, a play/pause control, a skip control, a sharing button, and "thumbs-up" and "thumbs-down" buttons.

FIG. 7*c* depicts an example display that may be shown at the conclusion of the custom audio program. The display allows the user to rate the program, for example by selecting a number of stars out of five stars, as shown at 716, and to submit the rating, for example by touching a "Submit" button, as shown at 718.

Figure 8:
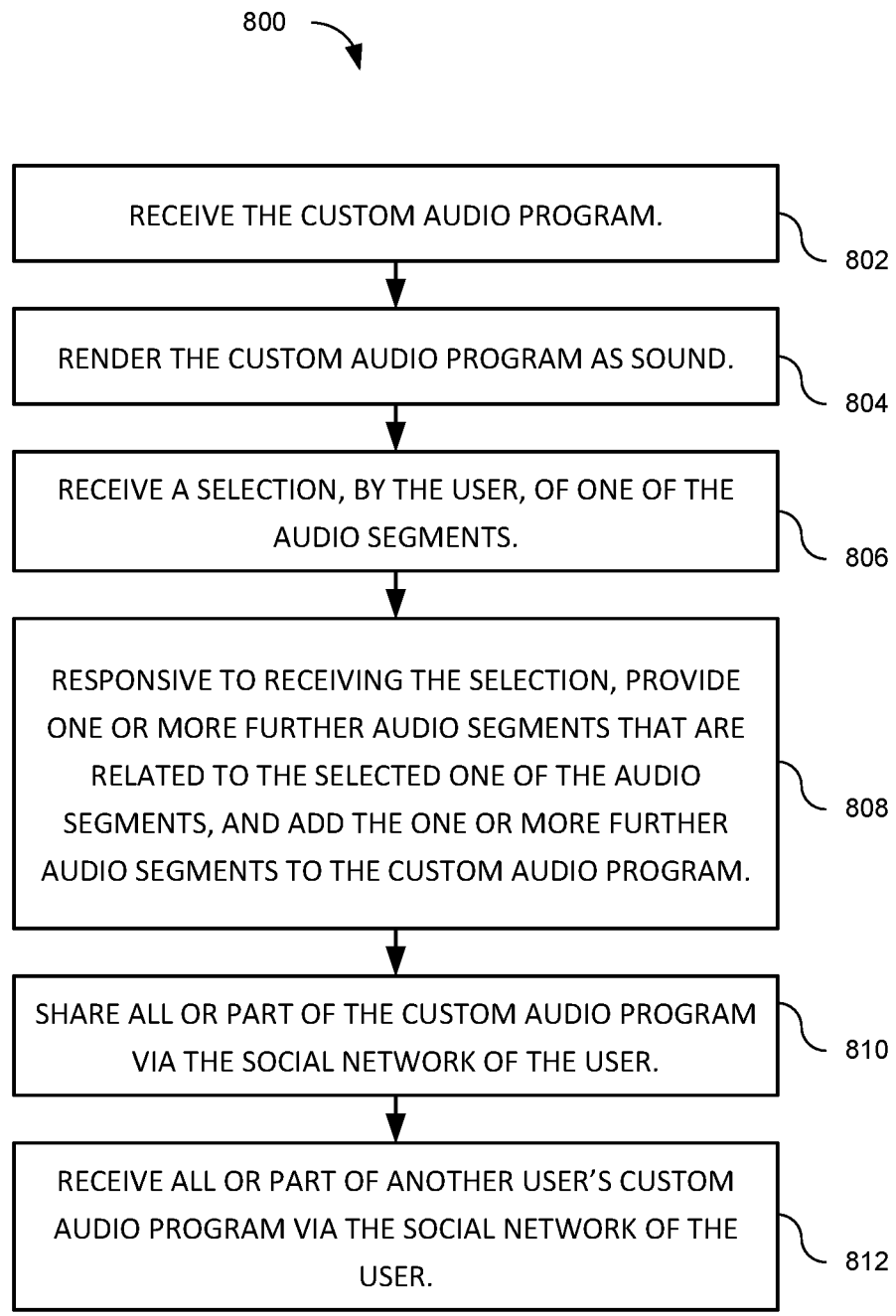
FIG. 8 depicts a process for using a custom audio program, according to some embodiments of the disclosed technology.

FIG. 8 depicts a process 800 for using a custom audio program 108, according to some embodiments of the disclosed technology. The process 800 may be performed by the user device 102 of FIG. 1. Referring to FIG. 8, the process 800 may include receiving the custom audio program 108, at 802. As described above, the custom audio program 108 may be delivered to the user device 102 as a stream, as a single file, or as multiple files with a playlist. The user device 102 may play the custom audio program 108, that is, render the custom audio program as sound, at 804.

As noted above, in some embodiments the user may "pivot" into one of the audio segments to obtain a longer and/or more detailed discussion of the topic covered by that audio segment. For example, referring again to FIG. 7*b*, the user may touch the "pivot" button 712 displayed next to one of the audio segments. The user device 102 may receive this selection, by the user, of the audio segment, at 806. Responsive to receiving the selection, the system 100 may provide one or more further audio segments that are related to the selected audio segment, and may add the one or more further audio segments to the custom audio program, at 808. In particular, the audio player app 104, responsive to operation of the "pivot" button 712, may communicate the selection to the custom audio program server 126. Responsive to receiving the selection, the custom audio program server 126 may obtain the one or more further audio segments, and may provide these audio segments to the user device 102. For example, these audio segments may be provided in the form of an update as described above.

In some embodiments, the user may share all or part of a custom audio program, for example over the user's social network, at 810. Referring again to FIG. 7, the user may operate the sharing button to share one or more audio segments, or the entire custom audio program. In some embodiments, a user may add audio content to a custom audio program prior to sharing the program. For example, while listening to the program, the user may add comments to the program. The content may be blended with the program audio, may be inserted into the program as a standalone comment, and the like. As another example, a user may create an audio introduction by adding comments to the beginning of the program.

Operating the sharing button may cause a sharing request to be sent to the custom audio program server 126. Responsive to receiving a request from the user, the custom audio program server 126 may share all or part of the custom audio program with other users. In some embodiments, this sharing may include sharing all or part of the custom audio program as social media of the user. The sharing request may specify which portions of the custom audio program are to be shared. When the user wishes to share the entire custom audio program, the sharing request may simply identify the custom audio program, which may be stored on the custom audio program server 126. When the user wishes to share less than the entire custom audio program, the sharing request may include or identify those portions. The sharing request may take a form similar to that in which the custom audio program was delivered to the user. For example, the sharing request may include a playlist that indicates the portion(s) of the custom audio program to be shared. As another example, the sharing request may include one or more files containing the portion(s) of the custom audio program to be shared. The sharing request may include content added by the user, for example as described above. For conciseness, the shared content, including the portions of the custom audio program specified by the user and any content added by the user, is referred to herein as the "shared audio program."

The sharing request may specify with whom the shared audio program should be shared. For example, the sharing request may specify one or more friends, one or more groups, people nearby, people in a specified geographic area, and the like. The sharing request may specify how the shared audio program should be shared. For example, the sharing request may specify the sharing should be implemented using podcast application(s), posting on social media page(s), sharing by email, and the like. The sharing request may specify when the shared audio program should be shared. For example, the sharing request may specify the sharing should take place immediately, at a specified time, after a specified delay, and the like. The sharing request may include any combination of the features describe above.

In some embodiments, the user may obtain all or part of the custom audio program of another user. For example, a friend may share all or part of the friend's custom audio program with the user. As another example, the user may subscribe to custom audio programs created by a celebrity. In any case, the user device 102 receives all or part of another user's custom audio program, for example over the social network of the user, at 812. The user may then play the shared custom audio program.

Some embodiments provide additional social features. In some embodiments, an audio chat room may be opened for a particular custom audio program so that listeners may exchange comments in a synchronous manner during the program. In such embodiments, the audio program may be started at substantially the same time for a group of listeners so the program resembles a "watch party," only for audio. These embodiments are useful for users sharing a commute, for example on a train, or users traveling at the same time. In these examples, the system may modify the program to synchronize play for the listeners in the group, for example by modifying durations of transition music segments for one or more of the users. These embodiments may be useful in other situations as well. For example, a tour bus may provide one or more audio segments describing landmarks and the like, and may open an audio chat room so the tourists aboard may chat about the landmarks. A similar embodiment may be implemented for a group of cars traveling a tour route.

In some embodiments, a custom audio program may take the form of a game. For example, the game may announce questions, to which the listeners may respond. The game may keep scores, and may announce the scores after each round of the game. As with the tour embodiment, the game may be hyperlocal in nature, requiring the contestants to provide answers regarding nearby features. For example, commuters on the 101 highway north of San Jose may be asked to identify the dirigible hangar at Moffett Field.

In some embodiments, the program may provide announcements describing the program's audience. The announcements may be hyperlocal in nature. For example, the program may announce the number of current listeners on the 101 highway at the moment. These hyperlocal social embodiments may contribute to wellness and mood regulation by reminding users that they are not alone.

Figure 9:
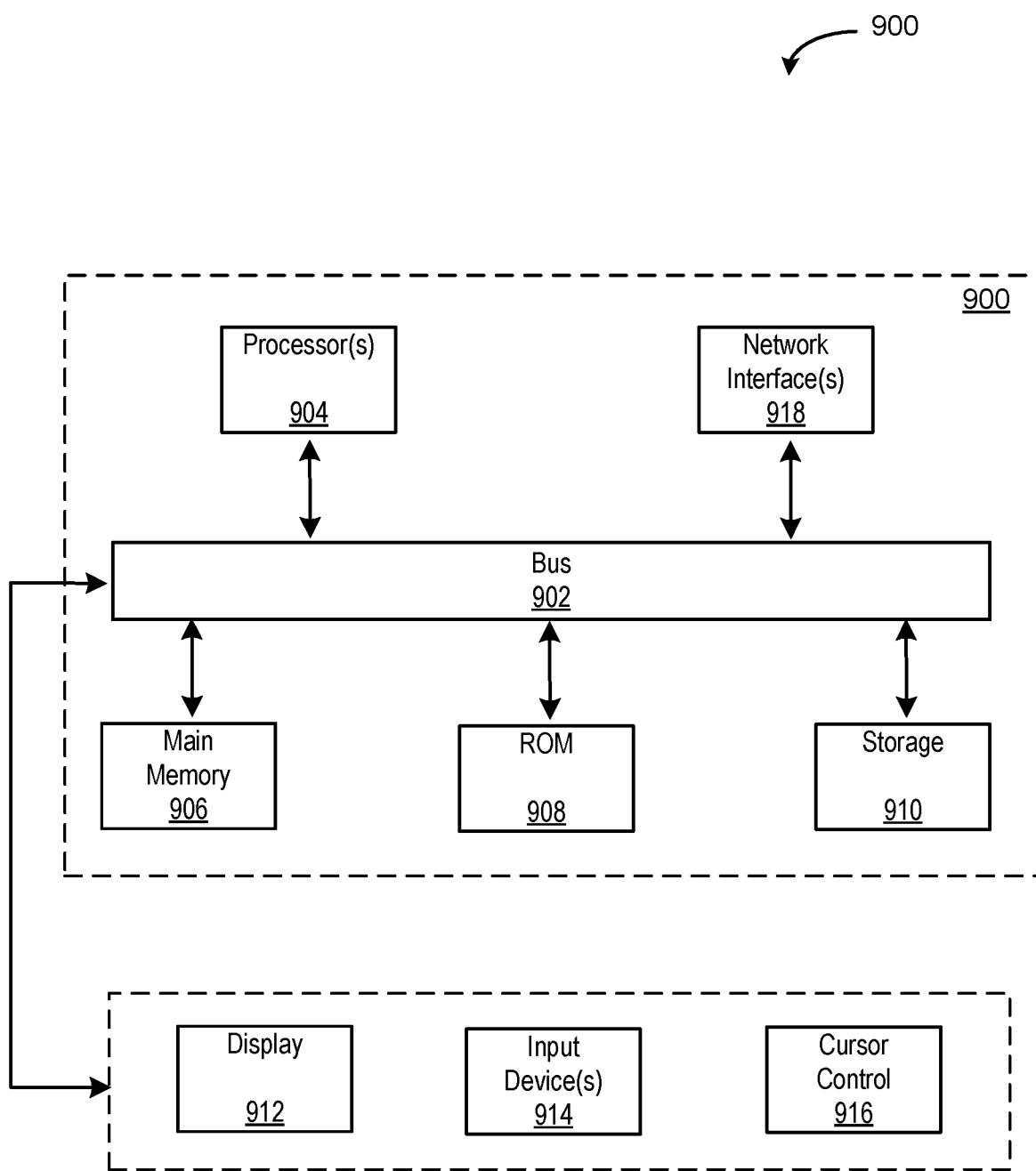
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 may be implemented in any device. For example, the computer system 900 may be implemented in a smartphone, tablet, laptop, automotive head unit, and the like. In some embodiments, parts of the computer system 900 may be implemented in the cloud.

The computer system 900 includes a bus 902 or other communication mechanism for communicating information, and one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. In particular, the instructions may implement the disclosed embodiments.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication mechanism coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain methods or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In some implementations, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a hardware processor; and
   a non-transitory machine-readable storage medium encoded with instructions executable by the hardware processor to perform a method for creating a custom audio program for a user for a journey, the method comprising:
   extracting journey-related information representing one or more aspects of the journey;
   generating one or more journey-related audio segments based on the journey-related information;
   extracting interest-related information from social media of the user;
   obtaining one or more interest-related audio segments based on the interest-related information; and
   assembling the custom audio program using the one or more journey-related audio segments and the one or more interest-related audio segments by:
   ranking the audio segments according to the interest-related information; and
   adding the audio segments to the custom audio program according to the ranking.

2. The system of claim 1, the method further comprising:
   responsive to receiving a request from the user, sharing all or part of the custom audio program with other users.

3. The system of claim 1, the method further comprising:
   receiving a selection, by the user, of one of the audio segments; and
   responsive to receiving the selection,
   (i) obtaining one or more further audio segments that are related to the selected one of the audio segments, and
   (ii) adding the one or more further audio segments to the custom audio program.

4. The system of claim 1, wherein assembling the custom audio program comprises:
   selecting a plurality of the audio segments according to durations of the audio segments and a duration of the journey.

5. The system of claim 1, the method further comprising:
   adding an introductory audio segment to the beginning of the custom audio program, wherein the introductory segment is customized for the user.

6. The system of claim 1, the method further comprising:
   determining a target mood for the user; and
   selecting at least one of the interest-related audio segments based on the target mood.

7. A non-transitory machine-readable storage medium encoded with instructions executable by the hardware processor to perform a method for creating a custom audio program for a user for a journey, the method comprising:
   extracting journey-related information representing one or more aspects of the journey;
   generating one or more journey-related audio segments based on the journey-related information;
   extracting interest-related information from social media of the user;
   obtaining one or more interest-related audio segments based on the interest-related information; and
   assembling the custom audio program using the one or more journey-related audio segments and the one or more interest-related audio segments by:

ranking the audio segments according to the interest-related information; and
adding the audio segments to the custom audio program according to the ranking.

8. The medium of claim 7, the method further comprising:
responsive to receiving a request from the user, sharing all or part of the custom audio program with other users.

9. The medium of claim 7, the method further comprising:
receiving a selection, by the user, of one of the audio segments; and
responsive to receiving the selection,
(i) obtaining one or more further audio segments that are related to the selected one of the audio segments, and
(ii) adding the one or more further audio segments to the custom audio program.

10. The medium of claim 7, wherein assembling the custom audio program comprises:
selecting a plurality of the audio segments according to durations of the audio segments and a duration of the journey.

11. The medium of claim 7, the method further comprising:
adding an introductory audio segment to the beginning of the custom audio program, wherein the introductory segment is customized for the user.

12. The medium of claim 7, the method further comprising:
determining a target mood for the user; and
selecting at least one of the interest-related audio segments based on the target mood.

13. A computer-implemented method for creating a custom audio program for a user for a journey, the method comprising:
extracting journey-related information representing one or more aspects of the journey;
generating one or more journey-related audio segments based on the journey-related information;
extracting interest-related information from social media of the user;
obtaining one or more interest-related audio segments based on the interest-related information; and
assembling the custom audio program using the one or more journey-related audio segments and the one or more interest-related audio segments by:
ranking the audio segments according to the interest-related information; and
adding the audio segments to the custom audio program according to the ranking.

14. The computer-implemented method of claim 13, further comprising:
responsive to receiving a request from the user, sharing all or part of the custom audio program with other users.

15. The computer-implemented method of claim 13, further comprising:
receiving a selection, by the user, of one of the audio segments; and
responsive to receiving the selection,
(i) obtaining one or more further audio segments that are related to the selected one of the audio segments, and
(ii) adding the one or more further audio segments to the custom audio program.

16. The computer-implemented method of claim 13, wherein assembling the custom audio program comprises:
selecting a plurality of the audio segments according to durations of the audio segments and a duration of the journey.

17. The computer-implemented method of claim 13, further comprising:
adding an introductory audio segment to the beginning of the custom audio program, wherein the introductory segment is customized for the user.

18. The computer-implemented method of claim 13, further comprising:
determining a target mood for the user; and
selecting at least one of the interest-related audio segments based on the target mood.

* * * * *